United States Patent [19]

Mülhaupt et al.

[11] Patent Number: 5,030,698

[45] Date of Patent: Jul. 9, 1991

[54] COMPOSITION OF EPOXY RESIN, BUTADIENE-ACRYLONITRILE COPOLYMER AND SEGMENTED COPOLYESTER, COPOLYAMIDE OR COPOLYESTERAMIDE

[75] Inventors: Rolf Mülhaupt, Freiburg, Fed. Rep. of Germany; Werner Rüfenacht, Marly, Switzerland

[73] Assignee: Ciba-Geigy Corporation, Ardsley, N.Y.

[21] Appl. No.: 471,574

[22] Filed: Jan. 29, 1990

[30] Foreign Application Priority Data

Feb. 2, 1989 [CH] Switzerland ............................ 368/89

[51] Int. Cl.$^5$ ...................... C08L 63/02; C08L 63/04
[52] U.S. Cl. ..................................... 525/423; 525/438
[58] Field of Search ................... 525/438, 423

[56] References Cited

U.S. PATENT DOCUMENTS

| | | | |
|---|---|---|---|
| 3,316,277 | 4/1967 | Frank et al. ........................ | 260/348 |
| 3,723,568 | 3/1973 | Hoeschele ........................... | 525/438 |
| 3,957,905 | 5/1976 | Sumoto et al. ..................... | 525/438 |
| 4,032,593 | 6/1977 | Samejima .......................... | 525/423 |
| 4,215,159 | 7/1980 | Donermeyer et al. .............. | 525/438 |
| 4,285,849 | 8/1981 | Dowbenko et al. ................. | 525/423 |
| 4,713,428 | 12/1987 | Mülhaupt et al. .................. | 525/533 |
| 4,908,273 | 3/1990 | Urech et al. ....................... | 525/438 |

FOREIGN PATENT DOCUMENTS

| | | | |
|---|---|---|---|
| 57-42728 | 3/1982 | Japan ................................... | 525/438 |
| 0311933 | 1/1972 | U.S.S.R. ............................. | 525/438 |
| 0747873 | 7/1980 | U.S.S.R. . | |

OTHER PUBLICATIONS

CA93(22):205627b.
Derwent Abstract of Russian 747,873.

*Primary Examiner*—John C. Bleutge
*Assistant Examiner*—Robert E. L. Sellers, II
*Attorney, Agent, or Firm*—JoAnn Villamizar

[57] ABSTRACT

Curable compositions are described comprising
(A) an epoxy resin having on average more than one epoxide group per molecule,
(B) a curing agent which can be activated at an elevated temperature for component (A),
(C) a liquid copolymer based on butadiene, acrylonitrile and, if appropriate, further ethylenically unsaturated comonomers, and
(D) a selected segmented copolymer consisting essentially of recurring soft segments containing polypropylene glycol units or polybutylene glycol units and selected hard segments having a softening point above 25° C. These compositions are suitable for use as, for example, adhesives.

14 Claims, No Drawings

COMPOSITION OF EPOXY RESIN, BUTADIENE-ACRYLONITRILE COPOLYMER AND SEGMENTED COPOLYESTER, COPOLYAMIDE OR COPOLYESTERAMIDE

The present invention relates to novel epoxy resin compositions and to the cured products obtainable therefrom.

Epoxidation products of polyalkylene glycols which are masked with hydroxyarylcarboxylic acids are known from GB-A-1,017,612. Cured products obtained from these epoxy resins are distinguished by good impact strength and high glass transition temperatures.

Thermoplastic block copolyesters which can be used for modifying epoxy resins are also known from U.S. Pat. No. 3,723,568.

In general, additives of this type effect an increase in the impact strength and in the flexibility of the cured product. However, the peel strength generally leaves something to be desired.

Heat-curable epoxide compositions of increased toughness which can be processed to give cured products of high strength and high glass transition temperatures and which are particularly suitable as structural hot-melt adhesives are provided by the invention.

The invention relates to curable compositions comprising
(A) an epoxy resin having on average more than one epoxide group per molecule,
(B) a curing agent which can be activated at an elevated temperature for component (A),
(C) a liquid copolymer based on butadiene, acrylonitrile and, if appropriate, other ethylenically unsaturated comonomers, and
(D) a segmented copolymer containing soft and hard segments of the formulae Ia and Ib or of the formulae IIa and IIb or of the formulae IIIa and IIIb or a combination of soft and hard segments of the formula IV

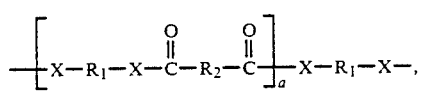

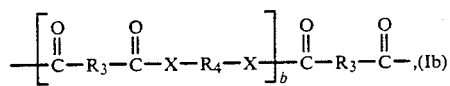

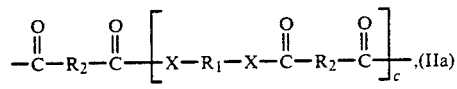

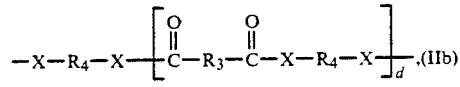

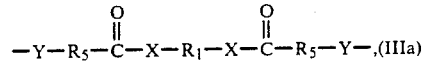

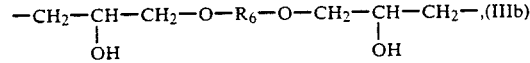

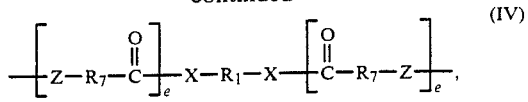

in which the hard segments of the formulae Ib, IIb and IIIb and the hard segments $-[CO-R_7-Z]-$ in formula IV have a softening point above 25° C., $R_1$ is the divalent radical of a polyalkylene glycol consisting essentially of polypropylene glycol or polybutylene glycol units after the removal of the hydroxy or amino end groups, $R_2$ and $R_3$ independently of one another are the divalent radical of a dicarboxylic acid after the removal of the carboxyl groups, $R_4$ is a divalent radical of a diol, diamine or aminoalcohol having a molecular weight of less than 400 after the removal of the functional groups, $R_5$ is a divalent radical of an aromatic hydroxycarboxylic acid or aminocarboxylic acid after the removal of the functional groups, $R_6$ is a divalent radical of an aromatic diglycidyl ether after the removal of the functional groups, $R_7$ is an alkylene radical or has one of the meanings defined for $R_5$, X and Z independently of one another are $-O-$ or $-NH-$, Y is $-O-$ or $-NR_8-$, $R_8$ is alkyl, the indices a and c independently of one another are an integer from 0 to about 100, preferably 0 to 10 and very particularly preferably 0 or 1, the indices b and d independently of one another are an integer from 1 to about 100, preferably 1 to 50 and very particularly preferably 1 to 10, and the index e is an integer from 1 to about 50, preferably 5 to 10.

Virtually all epoxy resins having an average of at least two 1,2-epoxide groups per molecule are suitable as the component (A) of the compositions according to the invention.

The following are examples of these:

(I) Polyglycidyl and poly-(β-methylglycidyl) esters which can be obtained, for example, by reacting a compound containing at least two carboxyl groups in a molecule with epichlorohydrin, glycerol dichlorohydrin or with β-methylepichlorohydrin in the presence of bases. Examples of compounds having at least two carboxyl groups in the molecule are saturated aliphatic dicarboxylic acids, such as oxalic acid, malonic acid, succinic acid, α-methylsuccinic acid, glutaric acid, adipic acid, pimelic acid, azelaic acid, sebacic acid or dimerized linoleic acid; or unsaturated aliphatic dicarboxylic acids, such as maleic acid, mesaconic acid, citraconic acid, glutaconic acid or itaconic acid; or cycloaliphatic dicarboxylic acids, such as hexahydrophthalic, hexahydroisophtalic or hexahydroterephthalic acid, or tetrahydrophthalic, tetrahydroisophthalic or tetrahydroterephthalic acid, or 4-methyltetrahydrophthalic acid, 4-methylhexahydrophthalic acid or endomethylenetetrahydrophthalic acid; or aromatic dicarboxylic acids, such as phthalic, isophthalic or terephthalic acid; or copolymers of (meth)acrylic acid with copolymerizable vinyl monomers, for example the 1:1 copolymers of methacrylic acid with styrene or with methyl methacrylate. Examples of tricarboxylic and polycarboxylic acids are especially aromatic tricarboxylic or tetracarboxylic acids, such as trimellitic acid, trimesic acid, pyromellitic acid or benzophenonetetracarboxylic acid, and also dimerized or trimerized fatty acids, such as are available commercially, for example under the name Pripol®.

(II) Polyglycidyl and poly-(β-methylglycidyl) ethers which can be obtained, for example, by reacting a compound containing at least two alcoholic hydroxyl groups and/or phenolic hydroxy groups in the molecule with epichlorohydrin, glycerol dichlorohydrin or β-methylepichlorohydrin under alkaline conditions or in the presence of an acid catalyst followed by treatment with alkali. Examples of compounds having at least two alcoholic hydroxyl groups and/or phenolic hydroxyl groups in the molecule are aliphatic alcohols, such as ethylene glycol, diethylene glycol and higher poly-(oxyethylene) glycols, propane-1,2-diol, propane-1,3-diol or higher poly-(oxypropylene) glycols, butane-1,4-diol or higher poly-(oxybutylene) glycols, pentane-1,5-diol, neopentyl glycol (2,2-dimethylpropanediol), hexane-1,6-diol, octane-1,8-diol, decane-1,10-diol or dodecane-1,12-diol; hexane-2,4,6-triol, glycerol, 1,1,1-trimethylolethane, 1,1,1-trimethylolpropane, pentaerythritol, sorbitol or polyepichlorohydrins; or cycloaliphatic alcohols, such as 1,3-dihydroxycyclohexane, 1,4-dihydroxycyclohexane, 1,4-cyclohexanedimethanol, bis-(4-hydroxycyclohexyl)-methane, 2,2-bis-(4-hydroxycyclohexyl)-propane or 1,1-bis-(hydroxymethyl)-cyclohex-3-ene; or alcohols containing aromatic groups, such as N,N-bis-(2-hydroxyethyl)-aniline or p,p'-bis-(2-hydroxyethylamino)-diphenylmethane; or mononuclear or polynuclear polyphenols, such as resorcinol, hydroquinone, bis-(4-hydroxyphenyl)-methane, 2,2-bis-(4-hydroxyphenyl)-propane, brominated 2,2-bis-(4-hydroxyphenyl)-propane, bis-(4-hydroxyphenyl) ether, bis-(4-hydroxyphenyl) sulfone, 1,1,2,2-tetrakis-(4-hydroxyphenyl)-ethane or novolacs which can be obtained by the condensation of aldehydes, such as formaldehyde, acetaldehyde, chloral or furfuraldehyde, with phenols which can be substituted by alkyl or halogen, such as phenol, the bisphenols described above, 2-methylphenol, 4-methylphenol, 4-tert.-butylphenol, p-nonylphenol or 4-chlorophenol.

(III) Poly-(N-glycidyl) compounds which can be prepared, for example, by dehydrochlorinating reaction products of epichlorohydrin with amines containing at least two amino hydrogen atoms. Examples of amines on which such epoxy resins are based are aliphatic amines, such as hexamethylenediamine or n-butylamine; cycloaliphatic amines, such as 1,4-diaminocyclohexane or bis-aminomethylene-1,4-cyclohexane; aromatic amines, such as aniline, p-toluidine, bis-(4-aminophenyl)-methane, bis-(4-aminophenyl) ether, bis-(4-aminophenyl) sulfone, 4,4'-diaminobiphenyl or 3,3'-diaminobiphenyl; or araliphatic amines, such as m-xylylenediamine.

The poly-(N-glycidyl) compounds also include, however, triglycidyl isocyanurate, N,N-diglycidyl derivatives of cycloalkyleneureas, such as ethyleneurea or 1,3-propyleneurea, and N,N'-diglycidyl derivatives of hydantoins, such as 5,5-dimethylhydantoin.

(IV) Poly-(S-glycidyl) compounds, for example di-S-glycidyl derivatives derived from dithiols, such as ethane-1,2-dithiol, or from bis-(4-mercaptomethylphenyl) ether.

(V) Cycloaliphatic epoxy resins or epoxidation products of dienes or polyenes, such as cycloaliphatic epoxy resins which can be prepared, for example, by epoxidation of ethylenically unsaturated cycloaliphatic compounds. Examples of these are 1,2-bis-(2,3-epoxycyclopentyloxy)-ethane, 2,3-epoxycyclopentylglycidyl ether, diglycidyl cyclohexane-1,2-dicarboxylate, 3,4-epoxycyclohexylglycidyl ether, bis-(2,3-epoxycyclopentyl) ether, bis-(3,4-epoxycyclohexyl) ether, 5(6)-glycidyl-2-(1,2-epoxyethyl)-bicyclo[2.2.1]heptane, dicyclopentadiene dioxide, cyclohexa-1,3-diene dioxide, 3,4-epoxy-6-methylcyclohexylmethyl 3',4'-epoxy-6'-methylcyclohexanecarboxylate or 3,4-epoxycyclohexylmethyl 3',4'-epoxycyclohexanecarboxylate.

However, it is also possible to use epoxy resins in which the 1,2-epoxide groups are attached to various heteroatoms or functional groups; such compounds include, for example, the N,N,O-triglycidyl derivative of 4-aminophenol, the N,N,O-triglycidyl derivative of 3-aminophenol, the glycidyl ether-glycidyl ester of salicylic acid, N-glycidyl-N'-(2-glycidyloxypropyl)-5,5-dimethylhydantoin or 2-glycidyloxy-1,3-bis-(5,5-dimethyl-1-glycidylhydantoin-3-yl)-propane.

Preferred components (A) are glycidyl ethers, in particular diglycidyl ethers based on bisphenols, such as bisphenol F or, in particular, bisphenol A, and glycidylated novolacs, in particular glycidylated novolacs based on phenol-formaldehyde novolac or based on cresol-formaldehyde novolac.

Components (A) which are very particularly preferred are solid diglycidyl ethers based on bisphenol A or solid combinations of these resins with liquid diglycidyl ethers based on bisphenol A.

In general, all heat-activatable curing agents for epoxy resins are suitable as the component (B) of the comositions according to the invention. These curing agents include, for example, aromatic amines, such as bis-(4-aminophenyl)-methane, aniline-formaldehyde resins, bis-(4-aminophenyl) sulfone, bis-(4-aminophenyl)-methane or 2,2-bis-(4-aminophenyl)-propane; polyaminoamides, such as those formed from aliphatic polyamines and dimerized or trimerized fatty acids; or amides, including substituted ureas, particularly ureas having aromatic radicals, such as N-(4-chlorophenyl)-N',N'-dimethylurea, N-(2-hydroxyphenyl)-N',N'-dimethylurea or 2,4-bis-(N,N-dimethylureido)-toluene; or polyphenols, such as resorcinol, hydroquinone or 2,2-bis-(4-hydroxyphenyl)-propane (bisphenol A) and novolacs based on monophenols or polyphenols, such as phenol or cresols, and aldehydes, such as formaldehyde, acetaldehyde or chloral; or anhydrides of polycarboxylic acids, such as phthalic anhydride, tetrahydrophthalic anhydride, hexahydrophthalic anhydride, hexachloroendomethylenetetrahydrophthalic anhydride, pyromellitic anhydride or benzophenone-3,3',4,4'-tetracarboxylic dianhydride; or curing agents having a catalytic action, for example tertiary amines, for example 2,4,6-tris-(dimethylaminomethyl)-phenol; imidazoles or Mannich bases, for example 1-methylimidazole, 2-methylimidazole, 2-phenylimidazole, 1-benzyl-2-methylimidazole or 1-cyanoethyl-2-methylimidazole; tin salts of alkanoic acids, for example tin octoate; Friedel-Crafts catalysts, for example boron trifluoride and boron trichloride and complexes and chelates thereof obtained by reacting boron trifluoride with, for example, 1,3-diketones, amines or ethers; or amidines, for example dicyandiamide or 1-cyano-3-(lower alkyl)-guanidines, for example the 3-methyl-, 3,3-dimethyl- or 3,3-diethyl- derivatives.

Preferred components (B) are amidines, in particular dicyandiamide.

Any desired liquid copolymers based on butadiene and acrylonitrile, if appropriate together with a further ethylenically unsaturated comonomer, can be employed as component (C) of the compositions according to the invention. These are mainly statistical copolymers. In general, component (C) is an elastomer prepolymer.

Within the scope of this description, a "liquid copolymer" is to be understood as meaning a compound which is flowable at temperatures below 80° C.

Examples of possible further ethylenically unsaturated comonomers for the preparation of component (C) are polar, ethylenically unsaturated comonomers, such as acrylic acid, methacrylic acid, esters of acrylic or methacrylic acid, for example the methyl or ethyl esters, amides of acrylic or methacrylic acid, fumaric acid, itaconic acid, maleic acid or esters and half-esters thereof, for example the monoesters or dimethyl esters, or maleic or itaconic anhydride, vinyl esters, for example vinyl acetate, polar styrenes, such as styrenes chlorinated or brominated in the nucleus, or methacrylonitrile; or non-polar, ethylenically unsaturated comonomers, such as ethylene, propylene or, in particular, styrene or substituted styrenes, such as vinyltoluene.

The proportion of comonomers in component (C) can vary within wide ranges. This component is so chosen that it is compatible with component (D). For this purpose, it is generally necessary for the difference between the solubility parameters of the soft segments in component (D) and the solubility parameters of the butadiene-acrylonitrile fractions of the copolymeric component (C) to be less than 0.6. Solubility parameters of this kind can be calculated, for example, by Small's method [J. Appl. Chem. 3, 71 (1953)]. The use of solubility parameters in determining the compatibility of polymer mixtures has been described, for example by C. B. Bucknall in "Toughened Plastics", chapter 2, Applied Science Publishers Ltd., London 1977.

In general, the average molecular weights (number average) of the liquid butadiene copolymers are 500–10,000, in particular 1,000–5,000. The acrylonitrile content of the preferred liquid butadiene copolymers is generally less than 50% by weight, especially 8 to 30% by weight, relative to the total monomer content.

Components (C) which are particularly preferred are liquid butadiene-acrylonitrile copolymers having functional groups which are reactive towards epoxy resins.

Examples of such copolymers are butadiene-acrylonitrile rubbers containing carboxyl or hydroxyl or amine groups, for example compounds of the type HYCAR ® made by Goodrich.

Components (A) and (C) can also be employed in the form of an adduct between an epoxy resin and a butadiene-acrylonitrile copolymer having functional groups reactive towards epoxide groups. The preparation of such adducts is effected in a manner known per se by heating the reactive butadiene-acrylonitrile rubber, for example a carboxyl-terminated copolymer, and the epoxy resin, if appropriate together with a catalyst, such as triphenylphosphine, a tertiary amine, an ammonium or phosphonium salt or chromium acetylacetonate, so that a precondensate which is fusible but still curable in combination with epoxy resins is formed.

Component (D) is a selected, segmented copolymer having soft segments based on special polyalkylene glycols and having special hard segments. Preferred segmented copolymers (D) have a softening point above 25° C.

The copolymers (D) should be compatible with the epoxy resin (A) and should form a mixture flowable at an elevated temperature, for example 80° to 180° C.

In general, these copolymers have an average molecular weight (number average) of about 1,000 to 100,000, preferably 1,500 to 20,000.

The soft segment is characterized by the presence of a divalent polypropylene or polybutylene glycol radical. As a rule, the polyalkylene glycol segments have a minimum length of about five recurring structural units in order to impart an adequate flexibility to the copolymer. It is also possible for mixtures of different polypropylene or polybutylene glycol radicals to be present within a copolymer molecule. It is also possible to employ copolyether segments formed from polypropylene glycol and polybutylene glycol units. In the case of this embodiment, it is also possible for up to 30% by weight of ethylene glycol units to be co-condensed into the copolyether radical. It is also possible for minor proportions of heteroatom segments, for example urea units, to be incorporated into the polyalkylene glycol segment.

Hydroxyl-terminated polyalkylene glycols can be obtained, for example, by anionic polymerization, copolymerization or block copolymerization of propylene oxide or butylene oxide, if appropriate in combination with ethylene oxide, with difunctional alcohols, such as 1,2-ethanediol or 1,4-butanediol, or with monofunctional or difunctional amines, such as methylamine, ethylenediamine or 1,6-hexamethylenediamine, as starter components, or by cationic polymerization or copolymerization of tetrahydrofuran or propylene oxide, if appropriate together with ethylene oxide, by means of acid catalysts, such as BF$_3$-etherate, or by polycondensation of glycols which can be polycondensed with the elimination of water, such as 1,3-propanediol or 1,4-butanediol, in the presence of acid etherification catalysts, such as p-toluenesulfonic acid.

Amino-terminated polyalkylene glycols are derived, for example, from the hydroxyl-terminated polyalkylene glycols described above by reacting compounds of this type containing primary hydroxyl groups, for example polybutylene glycol, with acrylonitrile and subsequently hydrogenating the products, or by reacting compounds of this type containing secondary hydroxyl groups with ammonia. Suitable amino-terminated polypropylene glycols are the compounds obtainable commercially under the name "Jeffamine ®" made by Texaco.

$R_1$ is preferably the divalent radical of a hydroxyl-terminated or amino-terminated polypropylene or polybutylene glycol after the functional groups have been removed.

The average molecular weights (number average) of these preferred polyalkylene glycols are between 500 and 5,000, in particular between 1,000 and 3,000.

The preferred radicals $R_1$ derived from the polyalkylene glycol derivatives enumerated above include the structural elements of the formulae Va to Ve

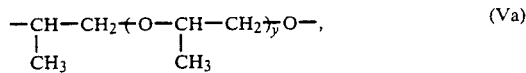

(Va)

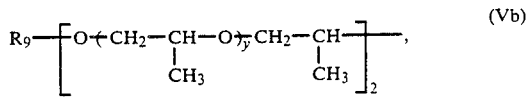

(Vb)

(Vc)

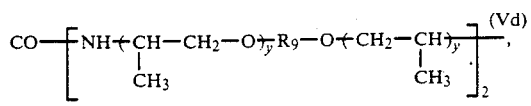

(Vd)

-continued $$-(CH_2)_3-O + (CH_2)_4-O +_{\overline{z}} (CH_2)_4-O-(CH_2)_3-, \quad (Ve)$$

in which y is 5 to 90, in particular 10 to 90, z is 10 to 40 and $R_9$ is a radical of an aliphatic diol after the two OH groups have been removed.

As divalent radicals of a dicarboxylic acid, $R_2$ and $R_3$ are, very generally, divalent, aliphatic, cycloaliphatic, aromatic or araliphatic radicals. Examples of such carboxylic acids are enumerated earlier in the text as components for the formation of glycidyl esters.

The hard segments of the formulae Ib, IIb or IIIb or in formula IV are characterized by a softening point higher than 25° C. In the case of hard segments having a crystallite melting point, this means a melting temperature above 25° C. In the case of hard segments not having a crystallite melting point, it means that the glass transition temperature of the hard segments should, in general, be at least 0° C.

$R_2$ and $R_3$ are preferably derived from saturated aliphatic dicarboxylic acids having 4 to 12 carbon atoms, particularly adipic and sebacic acid; from cycloaliphatic dicarboxylic acids having 8 to 12 carbon atoms, particularly tetrahydrophthalic or hexahydrophthalic acid, 4-methyltetrahydrophthalic acid or hexahydroterephthalic acid; or from aromatic dicarboxylic acids having 8 to 12 carbon atoms, particularly phthalic acid, isophthalic acid or terephthalic acid, cycloaliphatic and aromatic dicarboxylic acids being preferred for $R_3$.

The divalent radical $R_4$ of a diol, diamine or aminoalcohol having a molecular weight less than 400 is derived, very generally, from aliphatic, cycloaliphatic, aromatic or araliphatic compounds having one or two primary, secondary or tertiary alcohol groups and one or two primary or secondary amino groups. Examples of diols are enumerated earlier in the text as components for the formation of glycidyl ethers.

Preferred radicals $R_4$ are derived from saturated aliphatic α,ω-diols, α,ω-diamines or α,ω-aminoalcohols having 2 to 12 carbon atoms, particularly ethylene glycol, 1,3-propanediol, 1,4-butanediol, 1,6-hexanediol, 1,8-octanediol, 1,10-decanediol or 1,12-dodecanediol or the corresponding diamines or aminoalcohols; from cycloaliphatic diols or diamines having 6 ring carbon atoms, particularly 1,4-cyclohexane diol, 1,4-diaminocyclohexane or 1,4-cyclohexanedimethanol; or from mononuclear or dinuclear bisphenols or diamines having 6 to 12 carbon atoms, particularly resorcinol, hydroquinone, 2,2-bis-(4-hydroxyphenyl)-propane, 2,2-bis-(4-hydroxyphenyl)-methane, 2,2-bis-(4-hydroxyphenyl) ether, 2,2-bis-(4-hydroxyphenyl) sulfone or 4,4'-dihydroxybiphenyl or the corresponding diamines.

The divalent radical $R_5$ of an aromatic hydroxycarboxylic or aminocarboxylic acid can be mononuclear or polynuclear. Several aromatic radicals can be condensed with one another or are attached to one another via a direct C—C bond or via a bridge group.

$R_5$ is preferably a radical of the formula VIa, particularly of the formula VIb

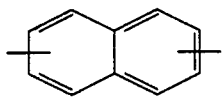 , 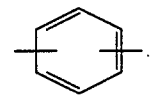

(VIa)  (VIb)

In these formulae the free valencies in the radicals of the formula VIa are preferably in the 1,5-position or 1,8-position and in the radicals of the formula VIb are preferably in the 1,3-position or 1,4-position.

The divalent radical $R_6$ of a diglycidyl ether is, very generally, a divalent, aliphatic, cycloaliphatic, aromatic or araliphatic radical, provided that the latter produces hard segments of the formula IIIb having a softening point above 25° C.

In general, the diglycidyl ethers on which $R_6$ is based are compounds based on bisphenols or synthesis products of such diglycidyl ethers and bisphenols. Examples of these are listed earlier in the text as the component (A).

The diols on which $R_6$ is based are preferably aromatic. This can mean mononuclear or polynuclear radicals. Several aromatic radicals can be condensed with one another or can be attached to one another via a direct C—C bond or via a bridge group.

$R_6$ is preferably a radical of a mononuclear or dinuclear bisphenol or a radical of the formula VIIa or VIIb

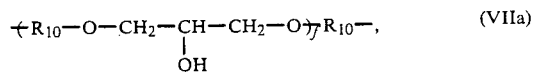 (VIIa)

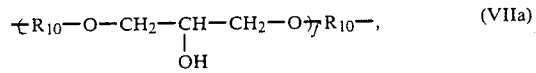 (VIIa)

 (VIIb), in which $R_{10}$ and $R_{11}$ independently of one another are mononuclear or polynuclear radicals of a bisphenol after the functional groups have been removed, $R_{12}$ is the radical of a dinuclear bisphenol bridged via a —CO— or —SO$_2$— group, after the functional groups have been removed, the index f is an integer from 1 to 50, particularly 1 to 20 and very particularly 3 to 10, and the index g is an integer from 1 to 100, particularly 1 to 10.

$R_{10}$ and $R_{11}$ are preferably radicals of a mononuclear or dinuclear bisphenol.

The particularly preferred bisphenol radicals $R_6$, $R_{10}$ and $R_{11}$ include 1,3-phenylene, 1,4-phenylene and, especially, the structural elements of the formula VIII

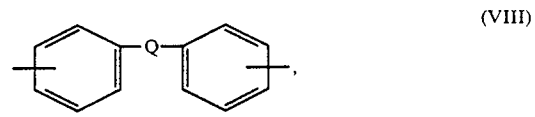 (VIII)

in which Q is a direct C—C bond, —CH$_2$—, —CH(CH$_3$)—, —C(CH$_3$)$_2$—, —C(CF$_3$)$_2$, —O—, —S—, —CO— or —SO$_2$— and in which the free valencies are preferably located in the 2,2'-, 3,3'- and, especially, in the 4,4'-position relative to the bridge Q.

The particularly preferred bisphenol radicals $R_6$ and $R_{12}$ include diphenyl-ketone-4,4'-diyl and, very particularly preferably, diphenyl-sulfone-4,4'-diyl.

$R_6$ is very particularly preferably a radical of the formulae IXa, IXb or IXc

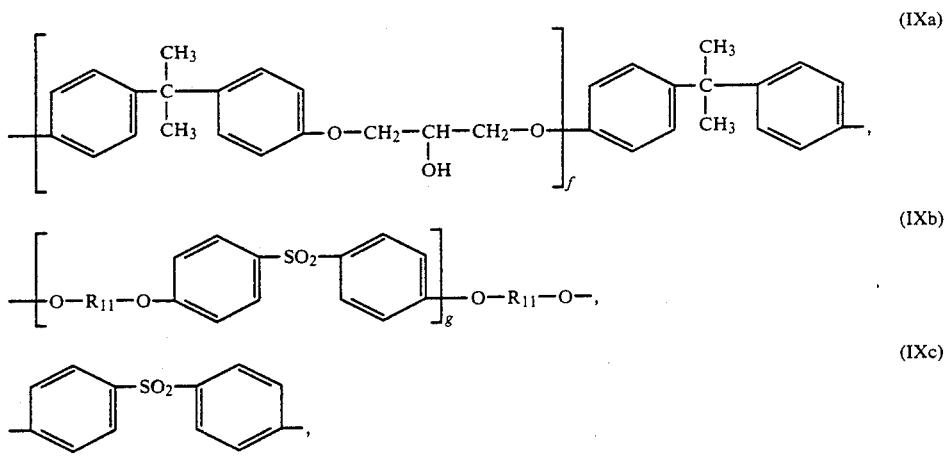

(IXa)

(IXb)

(IXc)

in which the index f is an integer from 3 to 10, the index g is an integer from 1 to 10 and $R_{11}$ is as defined above, being particularly 1,3-phenylene, 1,4-phenylene or a radical of the formula VIII in which Q is a direct C—C bond, —$CH_2$—, —$CH(CH_3)$—, —$C(CF_3)_2$—, —O—, —S— or, in particular, —$C(CH_3)_2$— and in which the free valencies are located in the 4,4'-position relative to the bridge Q.

The alkylene radical $R_7$ of a lactone or lactam can be linear or branched and must produce a hard segment having a softening point above 25° C. An example of this is the radical of pivalolactone or of caprolactam or laurolactam.

Alkyl, $R_8$ is preferably linear $C_1$-$C_6$alkyl, especially methyl.

The copolyesters of the type Ia/Ib or IIa/IIb are known from U.S. Pat. No. 3,723,568 and their disclosure is also a subject of the present description.

Preferred compositions contain, as the component (D), copolyesters composed of recurring structural units of the formulae Ia and Ib or IIa and IIb in which $R_1$ is derived from a polypropylene glycol or, especially, from a polybutylene glycol, $R_2$ and $R_3$ are derived from terephthalic acid, isophthalic acid or a mixture of these acids, and $R_4$ is the radical of an ethylene, butylene or hexamethylene glycol or a mixture of these diols, or $R_4$ is the radical of bisphenol A.

Compositions which are particularly preferred contain, as the component (D), copolyesters, copolyamides or copolyester-amides composed of recurring structural units of the formulae IIIa and IIIb. These copolymers are novel and are also a subject of the present invention.

Preferred copolyesters, copolyamides or copolyester-amides contain the recurring structural elements IIIa and IIIb in which $R_6$ is a radical of a mononuclear or dinuclear bisphenol or a radical of the formula VIIa or VIIb defined above; of these, particularly preferred types are those in which $R_{10}$ and $R_{11}$ are radicals of the formula VIII or, in particular, of the formula IXb.

X, Y and Z are preferably —O—.

The compounds containing recurring structural elements of the formulae Ia and Ib or IIa and IIb, particularly the polyesters, preferably contain carboxyl end groups. These carboxyl end groups can be obtained, for example, by masking hydroxyl end groups with carboxylic anhydrides.

The compounds containing recurring structural elements of the formulae IIIa and IIIb can contain phenolic hydroxyl end groups, N-alkylamino end groups or O-glycidyl end groups. The compounds having O-glycidyl end groups or phenolic hydroxyl end groups are preferred.

The compounds containing structural elements of the formula IV can, for example, contain phenolic hydroxyl end groups or amino end groups.

The polymers of the component (D) can be prepared by processes per se. Thus the polymers containing the recurring structural units of the formulae Ia or Ib or of the formulae IIa and IIb can be prepared by the polycondensation of diols, diamines or aminoalcohols of the formulae X and XI with dicarboxylic acids of the formulae XII and, if appropriate, XIII or with polyester-forming or polyamide-forming derivatives thereof, such as diesters or dichlorides,

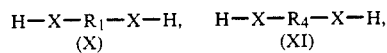

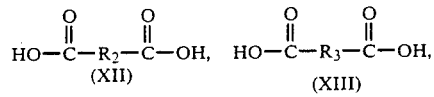

in these formulae $R_1$, $R_2$, $R_3$, $R_4$ and X are as defined above.

If polymers having hydroxyl or amino end groups are desired, an excess of the compounds X and XI should be initially taken. If the compounds XII and XIII are present in excess, carboxyl-terminated derivatives are formed. Carboxyl end groups can also be introduced by masking polymers containing hydroxyl or amino end groups with carboxylic anhydrides.

The molecular weights of the copolymers formed can be adjusted by means of the ratios of carboxylic acid components to the diol or diamino or aminoalcohol components. The conditions to be used for a desired molecular weight are known per se to those skilled in the art in the field of polycondensation.

It is also possible to prepare the copolymers containing recurring structural units of the formulae Ia and Ib or of the formulae IIa and IIb by the condensation of pre-condensed blocks. For this purpose it is possible for example, to pre-condense the compounds of the formulae X and XII and the compounds of the formulae XI and XIII separately, and to obtain a block of the desired molecular weight and the desired end groups via the ratios of the starting materials, and to condense these blocks, each containing different end groups, to give the copolymer (D).

The copolymers containing recurring structural units of the formulae IIIa and IIIb can be prepared by reacting compounds of the formula XIV with compounds of the formula XV or by reacting compounds of the formula XVI with compounds of the formula XVII

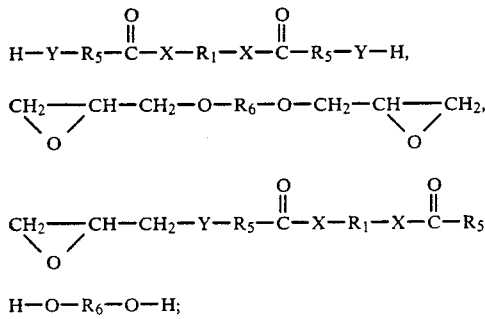

H—O—R$_6$—O—H;  (XVII)

in these formulae, R$_1$, R$_5$, R$_6$, X and Y are as defined earlier in the text.

The reaction of the diglycidyl ethers XV with the compounds of the formula XIV or of the diglycidyl ethers XVI with the compounds of the formula XVII can be effected analogously to the formation described above of an adduct of the butadiene-acrylonitrile copolymer and epoxy resins. Either epoxide-terminated adducts or phenol-terminated or N-alkylamino-terminated adducts can be prepared by selecting the amounts of the starting materials.

The copolymers of the formula IV can be obtained by masking diols, diamines or aminoalcohols of the formula X defined above with lactones or lactams. Examples of such reactions can be found in GB-A-1,565,580.

The starting materials of the formulae X to XIII in which Y is —O—, are known per se and are for the most part commercially obtainable.

The starting materials of the formula XIV and XVI are also known per se and are described, for example, in GB-A-1,017,612. The derivatives of these starting materials in which Y is —NR$_8$— can be prepared analogously by employing aromatic N-alkylaminocarboxylic acids instead of aromatic hydroxycarboxylic acids for masking the polyalkylene glycol.

The diglycidyl ethers of the formula XV and the diols of the formula XVII are also known per se and in part are commercially obtainable.

Diglycidyl ethers of polyether-sulfones are known, for example from DE-A-3,303,473.

Components (A), (C) and (D) in the compositions according to the invention should be compatible with one another. The choice of these components is effected, in general, in such a way that no visible phase separation takes place within the curable mixture above its softening temperature, preferably between 100° and 180° C.

Components (C) and (D) should dissolve in the epoxy resin (A), at least at an elevated temperature. Components (C) and (D) should be selected on the basis of the criteria listed above. Components (A), (C) and (D) are preferably so chosen that a multi-phase system is formed when the composition is cured.

If products of a high strength, glass transition temperature, peel strength, impact strength and resistance to crack propagation (fracture toughness) are desired, the proportion of the components (C) and (D), relative to the amount of (A), (C) and (D), will in general not exceed 60% by weight. The lower limit depends on the properties desired, for example the peel strength. As a rule, components (C) and (D) should amount to more than 5% by weight, preferably more than 10% by weight.

The ratio by weight of (C) to (D) can be varied within wide ranges. The preferred range of (C) to (D) is 50:1 to 1:50, in particular 5:1 to 1:5.

The proportion of the epoxy resin (A) to the total amount of (A), (C) and (D) can also be varied within wide limits. For high-strength products, larger proportions of component (A), for example 40 to 95% by weight and preferably 60 to 80% by weight, will generally be selected.

The proportion of the curing agent (B), relative to the epoxy resin (A), is generally dependent on the type of curing agent used and is known per se to those skilled in the art. In the case of dicyandiamide, which is particularly preferred, it is preferable to use 0.1 to 0.5 mole of the curing agent per mole of epoxide groups.

If appropriate, the compositions according to the invention also contain a curing accelerator (E). The nature and the amount of component (E) depend, as a rule, on the type of curing agent used and are known per se to those skilled in the art in the field of epoxide curing. Details are to be found in the "Epoxy-Handbook" by Lee and Neville (McGraw Hill, New York 1969).

If dicyandiamide curing agent systems are used, the curing temperatures of the compositions according to the invention are preferably between 80° and 280° C., particularly preferably between 100° and 200° C., and, if phenolic curing agent systems are used, approximately between 100° and 250° C.

If desired, curing can also be carried out in two stages, for example by interrupting the curing process or allowing the curable mixture to cure partially at lower temperatures. The products obtained thereby are still fusible and are soluble pre-condensates (so-called "B-stage resins"), and are suitable for use as, for example, compression moulding materials or sintering powders or for the production of prepregs.

If desired, reactive thinners, for example styrene oxide, butyl glycidyl ether, 2,2,4-trimethylpentyl glycidyl ether, phenyl glycidyl ether, cresyl glycidyl ether or glycidyl esters of synthetic, highly branched monocarboxylic acids, mainly tertiary aliphatic monocarboxylic acids, can be added to the curable mixtures in order to reduce the viscosity. Further conventional additives which the mixtures according to the invention can also contain are plasticizers, extenders, fillers and reinforcing agents, for example coal-tar, bitumen, textile fibres, glass fibres, asbestos fibres, boron fibres, carbon fibres, mineral silicates, mica, powdered quartz, hydrated aluminium oxide, bentonites, wollastonite, kaolin, silica aerogel or metal powders, for example aluminium powder or iron powder, and also pigments and dyes, such as carbon black, oxide colours and titanium dioxide, and also flame-retarding agents, thixotropic agents, flow control agents (which can also be used in part as mould release agents) such as silicones, waxes and stearates, or adhesion promoters, antioxidants and light stabilizers. In addition, it is also possible to add thermoplastics, for example polyesters, ethylene copolymers, polysulfones or polyether-sulfones.

The compositions according to the invention can be employed very generally for the preparation of cured products and can be employed in the formulation adapted to each special field of application, for example as adhesives, in particular hot-melt adhesives, as matrix resins or as surface coating agents.

As a rule, the curable compositions are solid or wax-like and can be employed as hot-melt adhesives in this form, particularly in combination with the conventional fillers and additives.

The invention also relates to the use of the curable mixtures for the purposes mentioned above.

The cured products are distinguished by the advantageous and surprising properties described at the outset. The invention also relates, therefore, to the products which can be obtained by heating the compositions according to the invention.

The following examples illustrate the invention.

1. Preparation of the copolymer component (D)

1.1. Copolymer D1

A mixture of 200 g of bishydroxyl-terminated polytetrahydrofuran ($M_n=2000$), 238 g of hexanediol, 388 g of dimethyl terephthalate and 2 g of dibutyltin oxide is subjected to polycondensation for 6 hours at 230° C., in the course of which methanol is removed by distillation. After the mixture has been at 300 mbar for 30 minutes, 37 g of phthalic anhydride are added and the mixture is stirred at this temperature for 90 minutes. A solid resin having the following analytical data is obtained:
Viscosity (Epprecht): 3600 mPas (150° C.);
Softening point: 140° C. (by Kofler's method);
Melting point (DSC): 134° C.;
Acid number: 22.4 equivalents/kg;
Molecular weight (GPC): $M_n=2240$; $M_w/M_n=6.0$.

1.2. Copolymer D2

400 g of bishydroxyl-terminated polytetrahydrofuran ($M_n=2000$), 226 g of hexanediol and 388 g of dimethyl terephthalate are subjected to condensation in the presence of 2 g of dibutyltin oxide as described in Example 1.1., and the product is masked with 37 g of phthalic anhydride. A resin having the following analytical data is obtained:
Softening point (Kofler): 126° C.;
Melting point (DSC): 128° C.;
Molecular weight (GPC): $M_n=2790$; $M_w/M_n=4.9$.

1.3. Copolymer D3

100 g of bishydroxyl-terminated polytetrahydrofuran ($M_n=2000$), 244 g of 1,6-hexanediol and 388 g of dimethyl terephthalate are subjected to polycondensation in the presence of 2 g of dibutyltin oxide as described in Example 1.1., and the product is masked with 37 g of phthalic anhydride. A solid resin having the following analytical data is obtained:
Softening point (Kofler): 140° C.;
Melting point (DSC): 136° C.;
Acid number: 16.3 mg of KOH/g
Molecular weight (GPC): $M_n=2040$; $M_w/M_n=4.1$.

1.4. Copolymer D4

Polytetrahydrofuran/polybutylene terephthalate copolymer (Hytrel ®4056) made by E. I. DuPont de Nemour & Co.

1.5. Copolymer D5

100 g of bis-(p-hydroxybenzoate)-terminated polytetrahydrofuran ($M_n=1560$, 1.47 equivalents of phenolic OH/kg, $\eta_{25}=6880$ mPas) and 148.1 g of epoxide solid resin based on bisphenol A (1.8 equivalents of epoxide/kg) are subjected to an addition reaction for 2 hours at 140° C. in the presence of 3 g of triphenylphosphine. A resin having the following analytical data is obtained:
Epoxide content: 0.6 equivalents/kg;
Softening point (Kofler): 90° C.

1.6. Copolymer D6

A mixture of 50 g of bis-(p-hydroxybenzoate)-terminated polytetrahydrofuran ($M_n=1560$, content of phenolic OH: 1.47 equivalents/kg, $\eta_{25}=6880$ mPas) and 105 g of the glycidyl ether of p,p'-dihydroxydiphenyl sulfone (epoxide content 3.2 equivalents/kg, softening point: 99° C.) is heated at 140° C. for 2 hours in the presence of 2.5 g of triphenylphosphine. A solid resin having the following analytical data is obtained:
Viscosity (Epprecht): 153,600 mPas (150° C.);
Epoxide content: 1.14 equivalents/kg;
Softening point (Kofler): 90° C.

2. Preparation of the butadiene-acrylonitrile component (C)

2.1. Adduct C1

A mixture of 730 g of bisphenol A diglycidyl ether (epoxide content: 5.4 equivalents/kg), 200 g of carboxyl-terminated acrylonitrile/butadiene copolymer (acrylonitrile content 26%, acid number 32 mg of KOH/g), 64 g of bisphenol A and 5 g of triphenylphosphine is heated at 130° C. for 3 hours until a viscous resin having an epoxide content of 3.3 equivalents/kg and an Epprecht viscosity of 130,000 mPas (40° C.) has been formed.

3. Formulations and testing of materials

Mixtures are prepared and tested as described in Table I. The determination of tensile shear strengths on sand-blasted, degreased aluminium sheets (Avional) 1.5 mm thick is carried out as specified in DIN 53,283. The determination of angle peel strength on degreased steel sheet (1403) 0.8 mm thick is carried out as specified in DIN 53,282. Curing is carried out for 30 minutes at 180° C. using a curing agent mixture consisting of 5 parts of bisphenol A diglycidyl ether (epoxide content: 5.4 equivalents/kg), 3.8 parts of dicyandiamide and 1.0 part of chlorotoluron [N-(3-chloro-4-methylphenyl)-N',N'-dimethylurea].

The quantity data in the table are parts by weight.

TABLE I

| | Adhesive formulations tested | | | | | |
|---|---|---|---|---|---|---|
| Example | 3.1 | 3.2 | 3.3 | 3.4 | 3.5 | 3.6 |
| Bisphenol A diglycidyl ether (epoxide content 5.4 equivalents/kg) | 8 | 8 | 8 | 10 | 8 | 10 |
| Solid epoxy resin based on bisphenol A (epoxide content 1.9 equivalents/kg) | 3 | 3 | 3 | — | 3 | 2 |
| Adduct C1 | 3 | 3 | 3 | 3 | 3 | 3 |
| Copolymer D1 | 6 | — | — | — | — | — |
| Copolymer D2 | — | 6 | — | — | — | — |
| Copolymer D3 | — | — | 6 | — | — | — |
| Copolymer D4 | — | — | — | 3 | — | — |
| Copolymer D5 | — | — | — | — | 6 | — |
| Copolymer D6 | — | — | — | — | — | 6 |
| Mixture of curing agents | 1.3 | 1.3 | 1.3 | 1.3 | 1.3 | 1.3 |
| Softening point (°C.) | 60 | 50 | 80 | 80 | 70 | 60 |
| Tensile shear strength (N/mm²) | 31.8 | 30.1 | 35.7 | 32.7 | 31.0 | 40.2 |
| Angle peel strength (N/mm) | 3.6 | 3.1 | 3.0 | 4.8 | 5.5 | 6.1 |
| (%) break of cohesion | 80 | 100 | 90 | 100 | 30 | 100 |

What Is Claimed Is:

1. A composition comprising
(A) an epoxy resin having on average more than one epoxide group per molecule,
(B) a curing agent which can be activated at an elevated temperature for component (A),
(C) a liquid copolymer based on butadiene, acrylonitrile and, if appropriate, other ethylenically unsaturated comonomers, and
(D) a segmented copolymer containing soft and hard segments of the formulae Ia and Ib or of the formulae IIa and IIb or of the formulae IIIa and IIIb or a combination of soft and hard segments of the formula IV

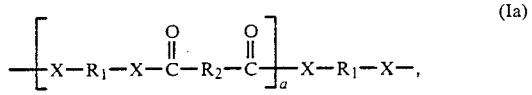
(Ia)

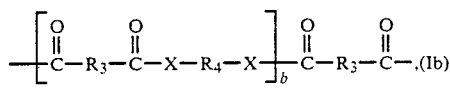
(Ib)

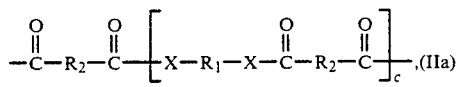
(IIa)

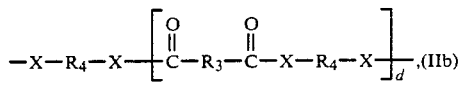
(IIb)

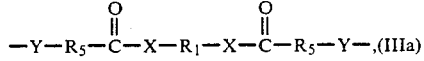
(IIIa)

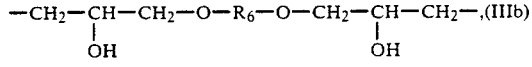
(IIIb)

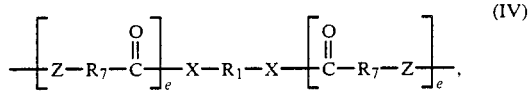
(IV)

in which the hard segments of the formulae Ib, IIb and IIIb and the hard segments —[CO—R$_7$—Z]— in formula IV have a softening point above 25° C., $R_1$ is the divalent radical of a polyalkylene glycol having a number average molecular weight of between 500 and 5,000 consisting essentially of polypropylene glycol or polybutylene glycol units after the removal of the hydroxyl or amino end groups, $R_2$ and $R_3$ independently of one another are the divalent radical of a dicarboxylic acid after the removal of the carboxyl groups, $R_4$ is a divalent radical of a diol, diamine or aminoalcohol having a molecular weight of less than 400 after the removal of the functional groups, $R_5$ is a divalent radical of an aromatic hydroxycarboxylic acid or aminocarboxylic acid after the removal of the functional groups, $R_6$ is a divalent radical of an aromatic diglycidyl ether after the removal of the functional groups, $R_7$ is an alkylene radical or has one of the meanings defined for $R_5$, X and Z independently of one another are —O— or —NH—, Y is —O— or —NR$_8$—, $R_8$ is alkyl, the indices a and c independently of one another are an integer from 0 to about 100, the indices b and d independently of one another are an integer from 1 to about 100 and the index e is an integer from 1 to about 50.

2. A composition according to claim 1, wherein component (A) is a glycidyl ether or a glycidylated novolac.

3. A composition according to claim 2, wherein component (A) is a diglycidyl ether based on a bisphenol or a glycidylated novolac based on phenol-formaldehyde or based on cresol-formaldehyde.

4. A composition according to claim 1, wherein component (B) is an amidine.

5. A composition according to claim 4, wherein component (B) is dicyandiamide.

6. A composition according to claim 1, wherein the average molecular weight (number average) of the component (C) is 1,000–5,000 and the acrylonitrile content is 8 to 30% by weight, relative to the total monomer content.

7. A composition according to claim 1, wherein the component (D) used is a copolyester composed of recurring structural units of the formulae Ia and Ib or IIa and IIb in which $R_1$ is derived from a polypropylene glycol or a polybutylene glycol, $R_2$ and $R_3$ are derived from terephthalic acid, isophthalic acid or a mixture of these acids, and $R_4$ is the radical of an ethylene, butylene or hexamethylene glycol or of a mixture of these diols, or $R_4$ is the radical of bisphenol A.

8. A composition according to claim 7, wherein $R_1$ is derived from a polybutylene glycol.

9. A composition according to claim 1, wherein the component (D) used is a copolyester composed of recurring structural units of the formulae IIIa and IIIb.

10. A composition according to claim 9, wherein $R_6$ is a radical of a mononuclear or dinuclear bisphenol or a radical of the formula VIIa or VIIb

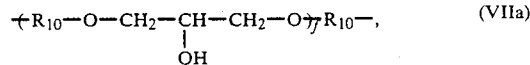
(VIIa)

(VIIb), in which $R_{10}$ and $R_{11}$ independently of one another are mononuclear or polynuclear radicals of a bisphenol after the functional groups have been removed, $R_{12}$ is the radical of a dinuclear bisphenol bridged via a —CO— or —SO$_2$— group, after the functional groups have been removed, the index f is an integer from 1 to 50 and the index g is an integer from 1 to 100.

11. A composition according to claim 9, wherein $R_6$ is a radical of the formula IXa, IXb or IXc

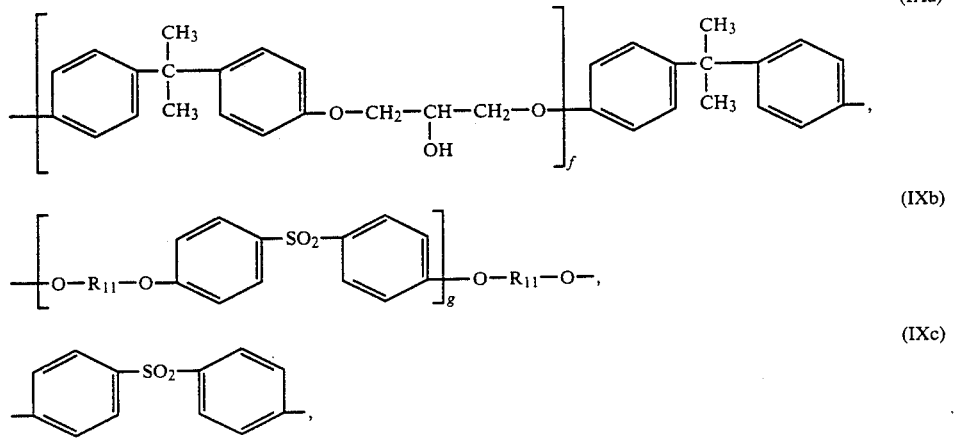

(IXa)

(IXb)

(IXc)

in which the index f is an integer from 3 to 10, the index g is an integer from 1 to 10 and $R_{11}$ is 1,3-phenylene, 1,4-phenylene or a radical of the formula VIII

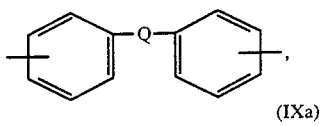

(VIII)

in which Q is a direct C—C bond, —CH$_2$—, —CH(CH$_3$)—, —C(CF$_3$)$_2$—, —O—, —S— or —C(CH$_3$)$_2$— and the free valencies are located in the 4,4'-position relative to the bridge Q.

12. A composition according to claim 11, wherein $R_{11}$ is a radical of the formula VIII in which Q is —C(CH$_3$)$_2$—.

13. A composition according to claim 1, wherein X, Y and Z are —O—.

14. A cured product obtainable by heating a composition according to claim 1.

* * * * *